United States Patent
Strom et al.

[11] Patent Number: 6,111,943
[45] Date of Patent: Aug. 29, 2000

[54] RAPID CALL SET-UP FOR MULTIPLE LEG TELECOMMUNICATIONS SESSIONS

[75] Inventors: Thomas Dale Strom, Naperville; Jane Ann Thompson; Robin Jeffrey Thompson, both of Batavia, all of Ill.

[73] Assignee: Lucent Technologies Inc., Murray Hill, N.J.

[21] Appl. No.: 09/162,813

[22] Filed: Sep. 29, 1998

[51] Int. Cl.[7] .................................................. H04M 3/42
[52] U.S. Cl. .......................... 379/211; 379/207; 379/201
[58] Field of Search ..................................... 379/211, 201, 379/205, 207, 219

[56] References Cited

U.S. PATENT DOCUMENTS 5,206,901  4/1993  Harlow et al. ...................... 379/201 X

*Primary Examiner*—Creighton Smith
*Attorney, Agent, or Firm*—Werner Ulrich

[57] ABSTRACT

Apparatus and a method for setting up a telecommunications call, wherein more than one candidate terminating station is alerted, and a connection is established from a calling station to the first of the candidate terminating stations which answer an alert. In one preferred embodiment, an executive processor complex assigns ports and processes in a call processing complex. An incoming process is assigned for the port which receives the call, and the plurality of outgoing processes are assigned to ports for accessing candidate terminating stations. The incoming port process has a list of the outgoing terminating port processes for the incoming call, and each outgoing process stores the identity of the incoming process. When an outgoing process receives an answer indication, it communicates directly with the incoming process, bypassing any communications with the executive processor complex. The incoming terminating process will establish a connection between the incoming port and the outgoing port that received the first answer indication, and will abandon connections from all of the other outgoing ports for this call. Advantageously, this arrangement minimizes the time that candidate stations which will not receive the call are alerted, and prevent such stations from receiving even momentary connections to the calling station.

6 Claims, 4 Drawing Sheets

RAPID CALL SET-UP FOR MULTIPLE LEG TELECOMMUNICATIONS SESSIONS

TECHNICAL FIELD

This invention relates to arrangements for setting up wireline and wireless telecommunications calls, and more specifically to arrangements for rapidly establishing connections in connection with a multiple leg alerting feature, i.e., a feature wherein several wireline or wireless stations are simultaneously alerted, but a connection is only established to one of these stations.

PROBLEM

Multiple leg alerting is a feature wherein one caller alerts several called parties and is then connected to the first called party to answer. The flexible alerting feature for wireless telecommunications systems is an example of a multiple leg feature. It is useful for customers having multiple cellular telecommunication stations, multiple land based telecommunication stations, or a mixture of cellular and land based telecommunication stations. When these customers set up flexible alerting, more than one station is alerted when the appropriate directory number is called. Then, a call is completed to the first such station which answers. Advantageously, in the simplest case, the customer who shuttles between a cellular station and a land based station can be reached by callers dialing a single telephone number, and can be reached whether he is at the cellular station, or at the land based station.

The flexible alerting feature has been recognized in the prior art as being important and an ANSI standard (Standard 41) includes a high level description of standards to be observed in establishing connections with respect to the flexible alerting feature.

The standard leaves many problems unsolved. The standard does not specify a method for rapid establishment of connections for flexible alerting or for a more general multiple leg ate. The switching system does not connect the voice path between the calling party and the first party to answer until the first answer signal is received. Without the presence of a talk path upon answer, initial speech from the first party to answer may not be heard by the calling party. If the response time is more than a fraction of a second, "yes" or "Jones" will be missed by the calling party who will think that no one is at the other end, and will leave both calling and called parties frustrated until one of them decides to say something, even in the absence of a voice response from the other station.

SOLUTION

The above problem is solved, and an advance is made over the teachings of the prior art in accordance with this invention wherein an incoming call is received for a multiple leg alerting group in one switching center; that switching center then establishes connections to candidate stations of the alerting group connected to the switching center, and/or to other switching centers connected to the other stations included in the alerting group; during the alerting interval, no connection is established between the incoming port in the receiving switching center, and the various ports used for connections to the candidate terminating stations; when one of these stations answers, a connection with the answering station is immediately established in the receiving switching center, and the other connections to other candidate stations in the alerting group are abandoned. Advantageously, using this arrangement no conference circuit is needed, and the response time between the detection of answer from one of the members of the flexible alerting group and the establishment of the connection is not much longer than the interval between detection of an off-hook (answer) signal and the cut-through of a connection for a land based call.

In accordance with one preferred embodiment of Applicants' invention, a mobile switching center receiving the flexible alerting call (hereafter the receiving mobile switching center) has access to a home location register, (HLR), in accordance with current practice in most mobile switching architectures. This home location register has stored for each flexible alerting group served by the receiving mobile switching center a block of data identifying the flexible alerting group for a particular flexible alerting directory number, and the directory numbers used for accessing each of the stations in the flexible alerting group. If one of these stations is currently served by the receiving mobile switching center, then the record for that station would indicate the mobile identification number for that mobile, plus an indication that the mobile is currently being served by the receiving mobile switching center. If the directory number is that of a land based station, then an indication to this effect is stored in the flexible alerting block for that directory number so that a connection can be established through the public switched telephone network (PSTN) to a land based switch serving that directory number. If the directory number is that of a mobile station currently served by another mobile switching center, but the data for that directory number is stored in the HLR that contains the flexible alerting group data, then an indication to that effect is stored for that directory number so that information on how to establish a connection to that mobile can be requested in the usual manner by sending a query from the HLR to the mobile switching center currently serving the directory number under discussion. Finally, if the directory number of a station in the flexible alerting group is one whose data is stored on a different HLR, then that station is treated as if it were a land based station so that a connection can be established via the public switched telephone network to the mobile switching center serving that directory number.

Connections from the receiving mobile switching center to the various stations in the flexible alerting group are established, for example, by sending set-up messages over the CCS 7 common channel signaling network to the switches serving the various stations to be alerted. This is achieved in a distributed control system via internal set-up commands from the controller to the trunk interface and signaling component. The internal set-up command includes the identity of the terminal process controlling the incoming call port, the destination address for the outgoing leg, and an indication that this is a flexible alerting call (i.e., the first answered outgoing call is to be connected to the incoming call port).

DETAILED DESCRIPTION

Figure 1:
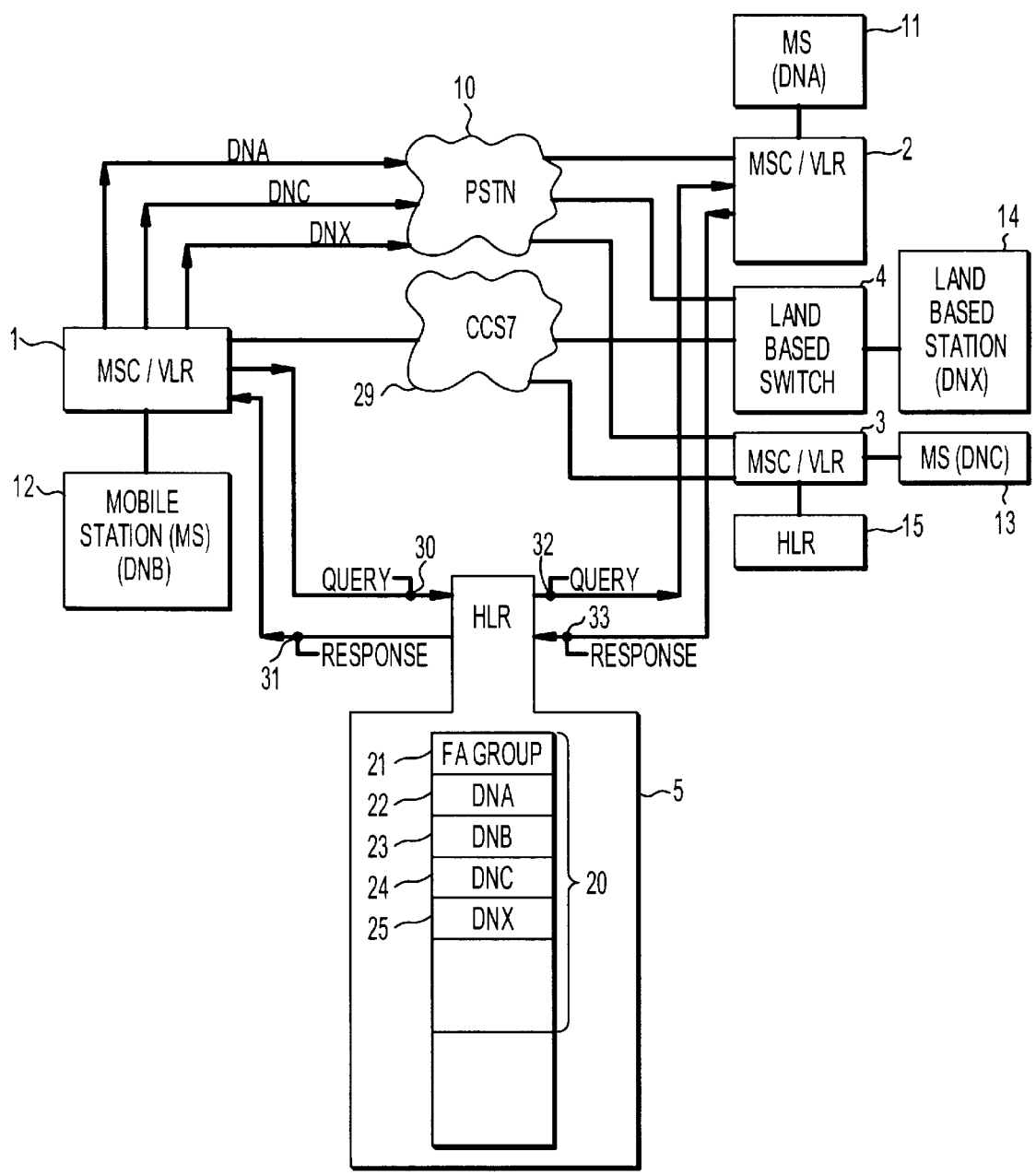
FIG. 1 is a block diagram illustrating the operation of Applicants' invention.

FIG. 1 is a block diagram illustrating the basic operation of Applicants' invention. An incoming call is received in a mobile switching center, (MSC), 1. The mobile switching center on receiving this incoming call, sends a query message 30 to its HLR 5. (The HLR may be a separate entity, or it may be integrated into MSC 1 according to different system topologies. The basic operation of Applicants' invention is independent of whether the HLR is integrated or separate). In this embodiment, the Visitor Location Register, (VLR), is a part of the MSC. In response to receiving the query message 30, an HLR determines that directory number for the query is that of a flexible alerting group for which information is stored in Block 20. Block 20 includes the identity of the flexible alerting group, and entries for each of the directory numbers of the flexible alerting group. To illustrate the operation of Applicants' invention, the particular flexible alerting group selected for FIG. 1 includes station 11 (directory number A, (DNA)), which is served by a mobile switching center 2 that is part of the same mobile telecommunications network as MSC 1. Information Block 22 has the directory number (DNA) of station 11. Station 12, having directory number B, is served by the receiving mobile switching center 1; its directory number information is stored in Block 23. Station 13, (having directory number C), is served by mobile switching center 3, which is not part of the same mobile telecommunications network as MSC 1 and MSC 2. The HLR data associated with station 13 exists on HLR 15. However, during processing of the query message 30, HLR 5 is unable to access HLR 15 to obtain information about station 13; (due to limitations in the documented standards). Information block 24 for station 13 of this network contains the directory number C. Finally, Block 25 contains a directory number X, that of a land based station 14 served by a land based switch 4. Connections to station 14 are made in the usual way that connections are made to any land based station of the public switched telephone network.

HLR 5, on the basis of information in Block 20, sends a response 31 to MSC 1, the response including instructions for establishing connections to stations 14, 11, and 13, and an indication that a connection should be established to station 12 served by MSC 1. For the case of mobile station 13, whose records are on HLR 15, not directly connected to MSC 1, MSC 1 routes a call through PSTN 10 to the home MSC 3 of mobile station 13. MSC 3 then queries HLR 15 in order to locate and set up the call to mobile station 13. For the case of the land based station 14, for which no HLR need be consulted, MSC 1 simply signals over CCS7 network 29 and connects via PSTN 10, to land based switch 4, which serves land based station 14. HLR 5 obtains information for station 11 by sending another query message 32 to mobile switching center/VLR 2. Mobile switching center/VLR 2, after determining the status of mobile station 11, generates a response message 33, providing details on the set-up message to be used for establishing a connection with mobile station 11.

Figure 2:
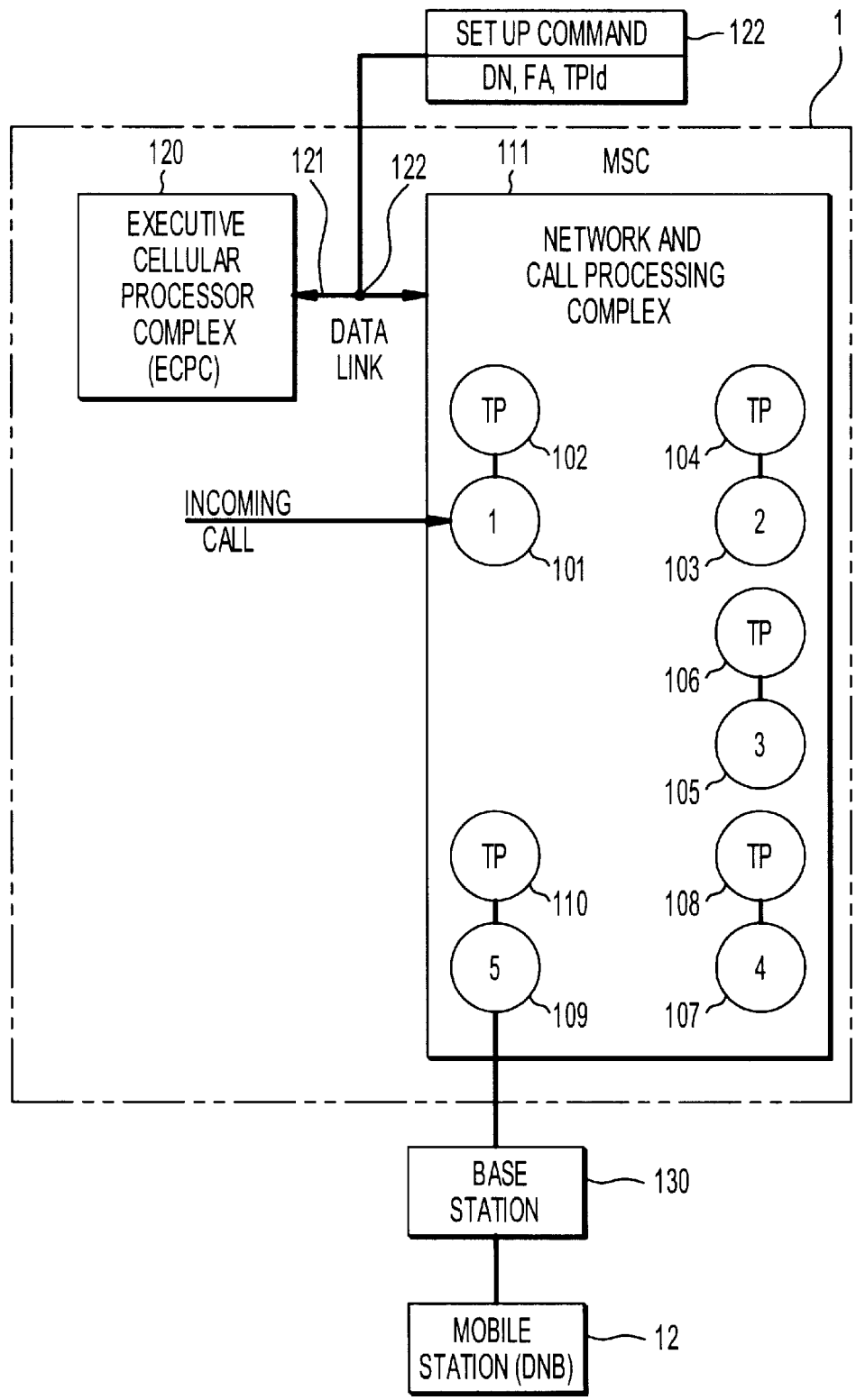
FIG. 2 is a diagram illustrating connections for a flexible alerting call in a serving mobile switching center.

FIG. 2 shows details of MSC 1. Block 111 represents the network and call processing complex of mobile switching center 1. An incoming call (the pilot call) is received at port 101. Terminal process 102 is created in order to control this incoming call. The terminal process 102 initiates notification of an incoming call to Executive Cellular Processing Complex (ECPC) 120 (a processor, or distributed group of processors). ECPC 120 controls the sending of a query 30 to HLR 5, (FIG. 1), in order to identify the potential terminals which may receive the call. As previously indicated, this query contains a directory number which is recognized by HLR 5, (FIG. 1), to represent a flexible alerting group. The HLR responds with an indication that this is a flexible alerting call and provides the directory, or routing numbers, to be used for the outgoing legs of the call. In response to receipt of the response 31 from HLR 5, (FIG. 1), an executive cellular processor complex (ECPC) 120 instructs the Network and Call Processing complex 111 to set up the outgoing legs of the call. Each outgoing leg is initiated by a set-up command 113 from ECPC 120 to the Network and CP Complex 111 over data link 121, including the outgoing leg routing instruction, (the directory number), an indication, (FA indicator), that this is an outgoing leg in a flexible alerting call (i.e., the first answered outgoing call is to be connected to the incoming call), and the terminal process ID (102) for the incoming leg terminal process. Each outgoing leg set-up command spawns a terminal process (104, 106, 108, and 110). Terminal process 104 is used for originating to mobile station 11, and is associated with terminal port 103. An outgoing trunk set-up is performed and the call is set-up to mobile station 11, (FIG. 1). During the alerting interval, no connections are established between the incoming party, and the outgoing ports connected to the candidate terminating stations.

If an answer message is received for port 103, terminal process 104, associated with port 103, has stored the identity of the incoming call terminal process 102, and an indication that this call is to be connected to the incoming leg if it is first answered. Terminal process 104 notifies terminal process 102 that answer has been received, and either receives an indication that the first answer is received on port 103 and the call should, therefore, be completed by connecting the path between port 101 and port 103, or terminal process 104 receives an indication that the answer received was not the first answer, and that disconnect should be sent for the outgoing leg from port 103. In addition, terminal process 102 notifies the ECPC 120 that the call has been answered by, and connected to, a specific outgoing call leg. The ECPC 120 can then send release command messages to the other terminal processes to release those outgoing call resources if they are still alerting.

In much the same way, port 105 is selected because it has access to the public switched network 10 for reaching a land based switch 4 which is connected to station 14, one of the other members of the flexible alerting group. Similarly, port 107 controlled by terminal process 108 is used to access public switched telephone network in order to reach mobile switching center 3 which controls connections to mobile station 13, another member of the flexible alerting group. Finally, port 109 is connected to base station 130 for accessing mobile station 12, the last member of the flexible alerting group.

When the first answer is received, terminal process 102 sends a message to ECPC 120 which responds with messages to abandon the connections to the other ports which have not yet responded with an answer signal, and responds with a disconnect for those other terminals which had responded with an answer signal. Whenever an answer is received, the terminal process connected to the port which has received the answer has in its record an indication of the identity of the pilot terminal process, and an indication that this process should be consulted directly instead of consulting the ECPC. As a result, the communications are much faster and the terminal process that has received the answer signal will rapidly cause a connection to be established between its terminal and the pilot terminal, and the rapid abandonment of other connections will minimize the false signals to later answers.

Figure 3:
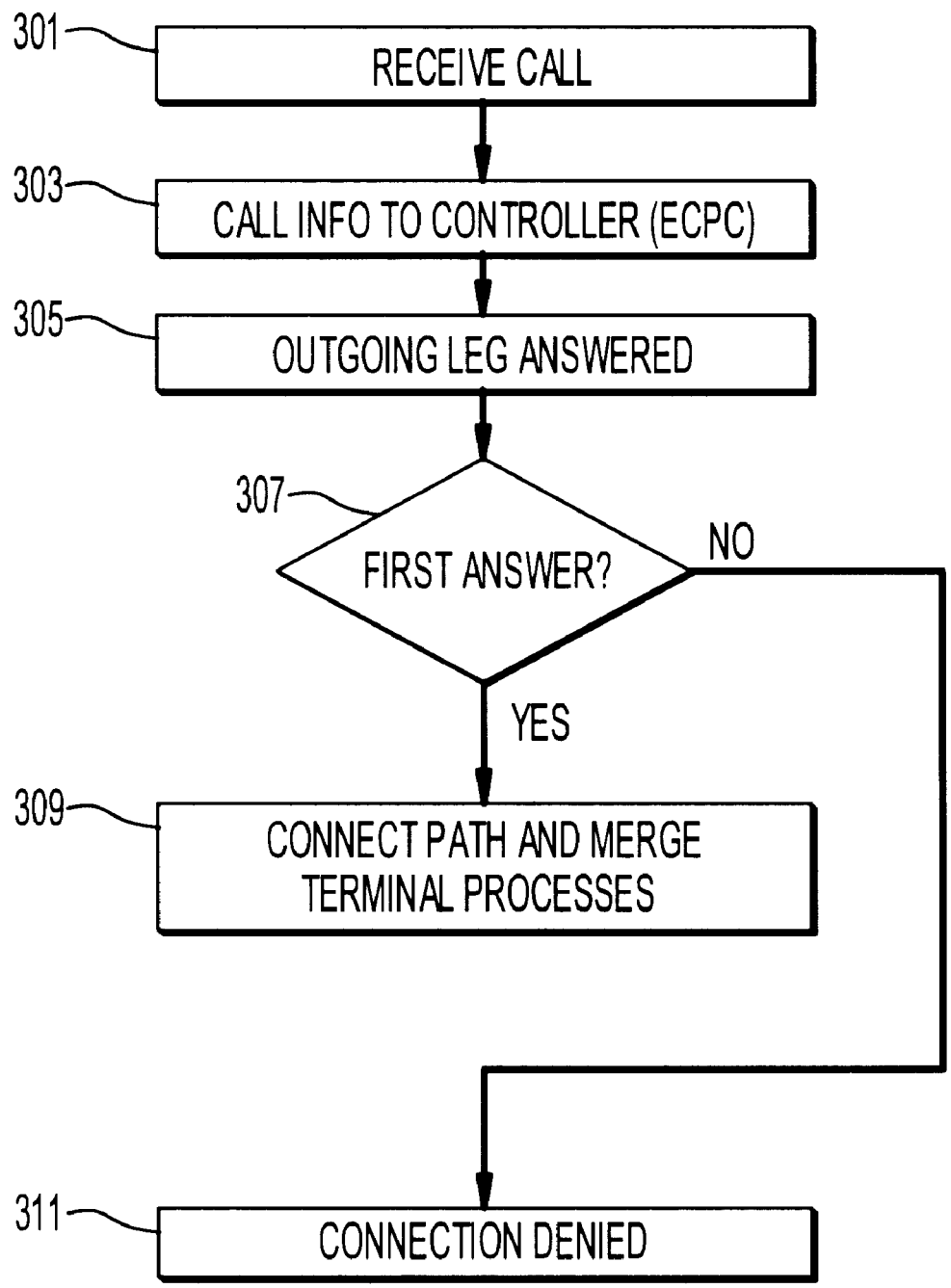
FIG. 3 is a flow diagram illustrating operations performed for an incoming flexible alerting call in the terminal process at the controlling switch where the call is received.

FIG. 3 illustrates the actions performed for an incoming flexible alerting call in the terminal process at the controlling switch where the call is received (Action Block 301). The call information is sent to the ECPC 120 (FIG. 2), (Action Block 303). At this point, an announcement may be made to the calling party to request patience by the calling party since no audible tone will be sent on this call. When an outgoing leg of the call is answered, (Action Block 305), Test 307 determines whether this is the first answer to the call. If so, (positive result of Test 307), then the path is established between the received pilot call and the leg which responded with the first answer, and the terminal processes for the pilot call and the answering leg are merged. The pilot TP takes over control of the call, (and the outgoing TP is killed). If the result of Test 307 is that this is not the first answer, then the connection to that leg is denied.

Figure 4:
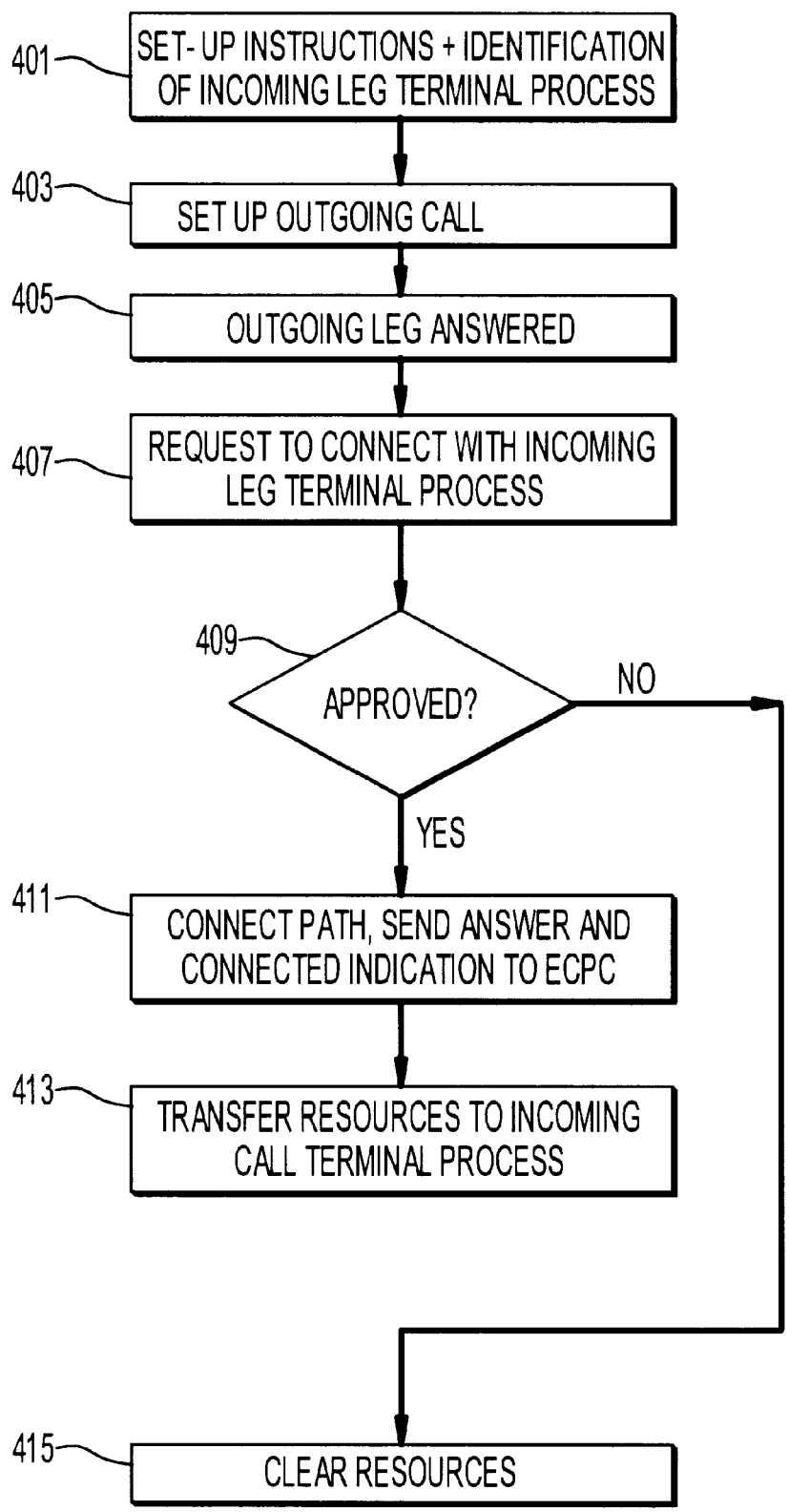
FIG. 4 illustrates the actions performed for outgoing call attempts for a flexible alerting call.

FIG. 4 illustrates the actions performed for outgoing call attempts for a flexible alerting call. It illustrates the actions controlled by the terminal process of one of the outgoing legs of the call. Set-up instructions are received along with the identification of the incoming leg terminal process, (Action Block 401). An outgoing call to the particular leg of the flexible alerting call is then set up (Action Block 403). When an answer signal is received from the outgoing leg, (Action Block 405), an attempt is made to connect with the incoming leg terminal process (Action Block 407). This attempt is made by having the outgoing leg process communicate directly with the incoming, or pilot call process without going through the ECPC 120 (FIG. 2). This saves appreciable time in connecting the call, an important feature for a flexible alerting call, since minimizing the answer time is highly desirable. Test 409 is used to determine whether the attempt to connect incoming leg and outgoing leg has been successful. If so, (positive result of Test 409), then the path is connected, (Action Block 411), the outgoing leg TP gives control of resources to the incoming (or pilot) terminal process, (Action Block 413), and an answer and connected indication, is sent to the ECPC (Action Block 411). If the attempt to connect is not successful, then the resources for this leg of the call are cleared, (Action Block 415).

While the above description has been in terms of the flexible alerting feature, a feature which only exists in mobile switching centers, the same basic arrangements can be used for land based systems wherein switching control points are queried instead of home location registers.

The above description is of one preferred embodiment of Applicants' invention. Many other embodiments will be apparent to those of ordinary skill in the art. The invention is only limited by the attached claims.

What is claimed is:

1. In a telecommunications network, a method of establishing a call in which a plurality of candidate terminating stations are alerted and in which a connection is only established to the first of the plurality of candidate stations to answer the alert, comprising the steps of:

receiving the call in a port of a receiving switching system;

assigning a terminal process to the received call;

requesting information about the call from a data base;

receiving information indicating that the call is one in which a plurality of candidate terminating stations are to be alerted;

assigning ports for accessing each of the candidate terminating stations, and creating a terminal process for each of the assigned ports;

establishing connections from each of the assigned ports to each of the candidate terminating stations, or to a switching system serving a candidate terminating station;

from the receiving switch, or from the switch connected to each of the candidate terminating stations, alerting each of the candidate terminating stations;

maintaining an open path between the incoming port that received the call and the ports in the receiving switch that are used for accessing the candidate terminating stations;

subsequently, in response to receipt of an answer indication at one of the ports used for accessing said candidate terminating stations, determining whether the answer indication was the first answer indication for this call;

if the answer indication was the first answer indication for this call, establishing a connection in the receiving switch between the incoming port and the port that received the answer indication;

if the answer indication was not the first answer indication for this call, disconnecting the connection between the port used for accessing the answering terminating station and the answering terminating station.

2. In a telecommunications network, a method of establishing a call in which a plurality of candidate terminating stations are alerted and in which a connection is only established to the first of the plurality of candidate stations to answer the alert, comprising the steps of:

receiving the call in a port of a receiving switching system;

assigning a terminal process to the received call;

requesting information about the call from a data base;

receiving information indicating that the call is one in which a plurality of candidate terminating stations are to be alerted;

assigning ports for accessing each of the candidate terminating stations, and creating a terminal process for each of the assigned ports;

establishing connections from each of the assigned ports to each of the candidate terminating stations, or to a switching system serving a candidate terminating station;

from the receiving switch, or from the switch connected to each of the candidate terminating stations, alerting each of the candidate terminating stations;

maintaining an open path between the incoming port that received the call and the ports in the receiving switch that are used for accessing the candidate terminating stations;

in response to receipt of an answer indication at one of the ports used for accessing said candidate terminating stations, determining whether the answer indication was the first answer indication for this call;

if the answer indication was the first answer indication for this call, establishing a connection between the incoming port and the port that received the answer indication;

if the answer indication was not the first answer indication for this call, disconnecting the connection between the port used for accessing the answering terminating station and the answering terminating station;

wherein the step of assigning terminal processes and terminating ports for the connections for accessing the candidate terminating stations performed under the control of an ECPC (executive control processor complex), and wherein the step of determining whether an answer signal was the first answer signal received, comprises the step of:

communicating directly between the process associated with a port on which the answer indication was received, and the process for the incoming port of the call, without communicating via the ECPC.

3. The method of claim 1, wherein the process for the outgoing ports used for accessing the candidate terminating stations, each maintaining a record of an identity of a process for the incoming port, and further comprising the steps of:

responsive to receipt of an answer indication from one of the ports connected to the candidate terminating stations sending a request to the process associated with the incoming port requesting a connection to the one port.

4. The method of claim 3, wherein the first answered port requesting a connection to the incoming port is connected, and subsequent requests are denied, and the outgoing call legs are released.

5. In a telecommunications network, apparatus for establishing a call in which a plurality of candidate terminating stations are alerted, and in which a connection is only established to the first of the plurality of candidate stations to answer the alert, comprising:

a telecommunications switching system comprising processor means operative under the control of a program for:

receiving the call;

assigning a terminal process to the received call;

transmitting a request for information about the call to a database shared by a plurality of switches;

receiving information from said database, said information indicating that the call is one in which a plurality of candidate terminating stations are to be alerted;

assigning terminals for accessing each of the candidate terminating stations, and creating a terminal process for each of the assigned ports;

controlling establishment of connections from each of the assigned ports to each of the candidate terminating stations, or to a switching system serving a candidate terminating station;

controlling alerting of candidate stations connected to the receiving switching system, and requesting alerting of each of the candidate terminating stations served by another switching system;

maintaining an open path between an incoming port that received the call, and the candidate terminating stations;

subsequently, in response to receipt of an answer indication, determining whether the answer indication was the first answer indication for this call;

if the answer indication was the first indication for this call, controlling establishment of a connection in said switching system between the incoming port, and the port of the receiving switch that received the answer indication;

if the answer indication was not the first answer indication for this call, controlling a disconnection of the connection between the port used for accessing the answering terminating station and the answering terminating station.

6. The apparatus of claim 5, wherein determining whether an answer signal was the first answer signal received comprises communicating directly within said processor means;

wherein said processor means comprises separate means for assigning terminal processes and terminal ports for the connections for accessing candidate terminating stations; and means for executing terminal processes;

wherein within said means for executing terminal processes, the processes communicate directly between a process associated with the port on which the answer indication was received, and a process for the incoming port of the call.

* * * * *